(12) United States Patent
Ryba

(10) Patent No.: US 9,890,803 B2
(45) Date of Patent: Feb. 13, 2018

(54) HYDRAULIC CYLINDER, PARTICULARLY SLAVE CYLINDER FOR A HYDRAULIC CLUTCH ACTUATING SYSTEM FOR MOTOR VEHICLES

(71) Applicant: FTE automotive GmbH, Ebern (DE)

(72) Inventor: Jürgen Ryba, Reckendorf (DE)

(73) Assignee: FTE Automotive GmbH, Ebern (DE)

( * ) Notice: Subject to any disclaimer, the term of this patent is extended or adjusted under 35 U.S.C. 154(b) by 0 days.

(21) Appl. No.: 15/226,257

(22) Filed: Aug. 2, 2016

(65) Prior Publication Data
US 2017/0037881 A1    Feb. 9, 2017

(30) Foreign Application Priority Data
Aug. 7, 2015 (DE) .......................... 10 2015 010 054

(51) Int. Cl.
*F15B 15/26* (2006.01)
*F16D 48/02* (2006.01)
(Continued)

(52) U.S. Cl.
CPC .............. *F15B 15/261* (2013.01); *F15B 7/08* (2013.01); *F15B 15/1471* (2013.01);
(Continued)

(58) Field of Classification Search
CPC .............. F15B 15/1447; F15B 15/1452; F15B 15/1471; F15B 15/261; F16D 25/08;
(Continued)

(56) References Cited

U.S. PATENT DOCUMENTS 4,556,137 A * 12/1985 Abe ....................... F16D 25/088
  192/111.12
6,766,710 B2 * 7/2004 Reul ................... F15B 15/1447
  74/473.11
(Continued)

FOREIGN PATENT DOCUMENTS

DE 10 2011 081 900 A1 2/2013
DE 10 2012 212 203 A1 2/2013
DE 10 2012 214 124 A1 2/2014

OTHER PUBLICATIONS

European Search Report; No. EP16001653 dated Jan. 24, 2017; 8 pages.
(Continued)

*Primary Examiner* — Thomas E Lazo
*Assistant Examiner* — Michael Quandt
(74) *Attorney, Agent, or Firm* — Reising Ethington, P.C.

(57) ABSTRACT

A hydraulic cylinder for a hydraulic clutch actuating system for motor vehicles has a piston subassembly with a piston and piston rod, a cylinder housing in which a pressure chamber is variably bounded at one side by the piston and fixedly bounded at the other side by a base of the cylinder housing. A spring element is arranged at the side of the piston opposite from the pressure chamber and is supported at one end on a spring plate on the housing side and operatively connected at the other end with the piston rod so as to bias the piston subassembly in a direction away from the base. A fixing section fixes the piston subassembly in a predetermined stroke setting with respect to the cylinder housing prior to first actuation of the hydraulic cylinder and is constructed to release the piston subassembly relative to the cylinder housing upon first actuation.

23 Claims, 5 Drawing Sheets

(51) Int. Cl.
  *F15B 7/08* (2006.01)
  *F15B 15/14* (2006.01)
  *F16D 25/12* (2006.01)
  *F16D 25/08* (2006.01)
  *F16D 13/58* (2006.01)

(52) U.S. Cl.
  CPC ........... *F16D 25/088* (2013.01); *F16D 25/12* (2013.01); *F16D 48/02* (2013.01); *F16D 2013/581* (2013.01); *F16D 2025/081* (2013.01); *F16D 2048/0212* (2013.01)

(58) Field of Classification Search
  CPC ...... F16D 25/088; F16D 25/12; F16D 25/126; F16D 2025/081; F16D 2048/0212
  See application file for complete search history.

(56) References Cited

U.S. PATENT DOCUMENTS 7,216,752 B2 * 5/2007 Derra ................... F16D 25/088
                                                         192/85.59
7,287,376 B2 * 10/2007 Macht .................. F16D 25/088
                                                         60/533

OTHER PUBLICATIONS

German Office Action , Application No. 10 2015 010 054.8, Applicant: FTE automotive GmbH, dated May 25, 2015, 6 pages.

* cited by examiner

HYDRAULIC CYLINDER, PARTICULARLY SLAVE CYLINDER FOR A HYDRAULIC CLUTCH ACTUATING SYSTEM FOR MOTOR VEHICLES

TECHNICAL FIELD

The present invention relates to a hydraulic cylinder in particular, a slave cylinder for a hydraulic clutch actuating system for motor vehicles, such as used on a large scale in the automotive industry.

BACKGROUND OF THE INVENTION

A conventional hydraulic clutch actuating system for motor vehicles has a master cylinder connected with an equalizing reservoir filled with hydraulic fluid. The master cylinder has a cylinder housing with a housing bore in which a piston is received to be longitudinally displaceable. The master cylinder piston bounds a pressure chamber in the housing bore of the cylinder housing and can be mechanically loaded with an actuating force by a clutch pedal or an electric-motor drive. The pressure chamber of the master cylinder is hydraulically connected with a pressure chamber of a slave cylinder by way of a pressure line so that the pressure generated in the pressure chamber of the master cylinder by depressing the clutch pedal or electric-motor displacement of the master cylinder piston is transmissible to the pressure chamber of the slave cylinder by way of a fluid column in the pressure line. The slave cylinder similarly includes a cylinder housing with a housing bore in which a piston bounding the pressure chamber of the slave cylinder and thus loadable with the pressure generated in the master cylinder is received to be longitudinally displaceable. Associated with the slave cylinder piston is a piston rod engaging a clutch lever which in turn is in operative connection with the release bearing of the clutch. As a result, the release bearing of the clutch can be loaded with an actuating force via the slave cylinder piston so as to separate the clutch pressure plate from the clutch drive disc by way of a release mechanism and thus the motor from the transmission of the motor vehicle.

The slave cylinder commonly has a spring element serving the purpose of biasing the slave cylinder piston in a direction away from a base of the cylinder housing so as to keep the end of the piston rod in the mounted state of the slave cylinder in contact with the associated seat at the clutch lever and to exert a preload on the release bearing. In previously known solutions, this spring element is primarily constructed as a helical compression spring. See, for example, U.S. Pat. No. 7,216,752 B2 (FIG. 1) when the spring element in a first alternative is arranged in the pressure chamber where it is supported at one end on the base of the cylinder housing and at the other end on the piston by way of a spring plate. Conversely, see, for example, U.S. Pat. No. 7,287,376 B2 (FIG. 1) where the spring element is at the side of the piston opposite from the pressure chamber, surrounds the piston rod, and at an end thereof distant from the piston bears against an annular collar of the piston rod. The spring element is supported at the end thereof near the piston on the cylinder housing by way of a spring plate.

The latter alternative is advantageous insofar as there is no risk of the spring element contacting and possibly damaging the cylinder housing wall in the region of the seal sliding surface. Moreover, in this alternative of the slave cylinder, self-bleeding is better not only in the case of first filling, but also in operation of the slave cylinder, because there is no spring element, to which air bubbles could adhere, in the pressure chamber. Finally, in this alternative the spring element advantageously also serves for setting the piston rod straight relative to the cylinder housing, which facilitates assembly of the slave cylinder.

In connection with, in particular, hydraulic clutch actuating systems which are supplied to the assembly line of the motor vehicle manufacturer as a unit preassembled from master cylinder, equalizing reservoir, pressure line and slave cylinder and filled with hydraulic fluid, measures have been proposed to temporarily shackle the piston rod of the slave cylinder with respect to the cylinder housing of the slave cylinder so as to avoid overfilling of the hydraulic clutch actuating system and for transport thereof as well as to facilitate mounting of the unit in the motor vehicle.

The slave cylinder according to U.S. Pat. No. 7,287,376 B2, thus has a fixing section which fixes the piston subassembly of the piston and piston rod in a predetermined stroke setting with respect to the cylinder housing against the force of the spring element prior to first actuation of the slave cylinder and is constructed to release the piston subassembly relative to the cylinder housing when first actuation of the slave cylinder takes place. The fixing section is provided in the pressure chamber at the housing base and co-operates with a mating element at the piston for releasable fixing of the piston subassembly with respect to the cylinder housing. More precisely, the fixing section is formed at an insert member inserted into a pressure connection, which is provided at the housing base, of the slave cylinder. A piston extension at the pressure chamber side of the piston forms a mating element able to be mechanically positively detented with the fixing section of the insert member.

This arrangement of the fixing section in the pressure chamber at the housing base of the cylinder housing is certainly advantageous to the extent that the end of the piston rod remote, i.e., opposite from the piston remains free for non-problematic mounting of sliding socket, protective dust cap or the like, and the fixing section does not obstruct angular movement of the piston rod with respect to the center axis of the cylinder housing and cannot cause undesired friction noise. However, additional installation space is needed in the pressure chamber of the prior art slave cylinder in order to accommodate the fixing section and this space lengthens the slave cylinder for a given stroke, which can be undesirable for specific confined installation situations.

What is needed is a hydraulic cylinder for a hydraulic actuating system for motor vehicles, in which the piston subassembly can be fixed in a predetermined stroke setting relative to the cylinder housing prior to the first actuation of the hydraulic cylinder and can be released when first actuation of the hydraulic cylinder takes place, without the measures for temporary fixing of the piston subassembly requiring additional installation space.

SUMMARY OF THE INVENTION

According to one aspect of the invention, a hydraulic cylinder, particularly a slave cylinder for a hydraulic clutch actuating system for motor vehicles has a piston subassembly with a piston and a piston rod, and a cylinder housing in which is provided a pressure chamber variably bounded on one side by the piston and fixedly bounded on the other side by a base of the cylinder housing. A spring element is arranged at the side of the piston opposite from the pressure chamber, the spring element being supported at one end on a spring plate on the housing side and operatively connected at the other end with the piston rod so as to bias the piston subassembly in a direction away from the base of the cylinder housing. A fixing section fixes the piston subassembly in a predetermined stroke setting with respect to the cylinder housing prior to first actuation of the hydraulic cylinder, and is constructed to release the piston subassembly relative to the cylinder housing when first actuation of the hydraulic cylinder takes place. The fixing section is formed at the spring plate and co-operates with a mating section at the piston rod for releasable fixing of the piston subassembly with respect to the cylinder housing.

Thus, according to one embodiment of the invention, no additional component, which demands further installation space, is provided in order to form the fixing section. Instead, the spring plate which is already present is advantageously also used for the releasable fixing of the piston subassembly relative to the cylinder housing. The integration of two functions by the spring plate provides an expeditious and economic construction with few parts. Because the fixing section integrated at or in the spring plate co-operates with the associated mating section at the piston rod, which with the cylinder construction present here lies radially inwardly with respect to the spring element opposite from the pressure chamber, the installation space already provided and present for housing the spring element can advantageously also be used for the temporary shackling of the piston subassembly relative to the cylinder housing. In other words, the annular space bounded radially outwardly by the spring element and radially inwardly by the piston rod is usable to receive the fixing section at the spring plate and the mating section at the piston rod in a very compact and short configuration of the hydraulic cylinder.

A further advantage of the construction of the fixing section at the spring plate in accordance with one aspect of the invention is that by comparison with other previously known solutions with temporary fixing of the piston subassembly relative to the cylinder housing on the piston rod side of the piston opposite from the pressure chamber such as disclosed in, for example, the afore-mentioned U.S. Pat. No. 7,216,752 B2, the fixing section cannot migrate or move in the axial direction of the hydraulic cylinder at the time of or after first actuation of the hydraulic cylinder, but remains at the spring plate in a fixed position as seen in the axial direction of the hydraulic cylinder. Thus, in principle it is possible, for example for repair purposes or even after an unintended release of the temporary shackling, for example during transport of the hydraulic cylinder, to re-shackle or shackle once more the mating section at the piston rod to the fixing section of the stationary spring plate and consequently the piston subassembly relative to the cylinder housing.

Finally, such a multi-functional spring plate can also be produced very economically in mass production by injection-molding from plastic material.

In principle it is possible, for retaining or centering the spring element relative to the cylinder housing, to provide the spring plate with, for example, an annular projection which engages within a piston-adjacent end of the spring element. However, with respect to secure seating of the spring element again in conjunction with a short form of construction it is preferred if the spring plate is formed by an annular member with an inner annular section through which the piston rod extends, an outer annular section by way of which the spring plate is secured to the cylinder housing, a base section which connects the inner annular section and the outer annular section, and an annular recess, which is bounded between the aforesaid sections, for receiving the piston-adjacent end of the spring element.

Preferably, the inner annular section has at its free end at the inner circumference an annular bead which forms the fixing section of the spring plate and which is capable of slight radial spring-back, whereas the piston rod has a piston rod head provided at the outer circumference with a substantially crowned annular collar as seen in cross-section, which forms the mating section of the piston rod and which in the fixed state of the piston subassembly is axially supported on the annular bead. As an alternative, in principle a construction is also contemplated in which an elevated structure for example, an encircling lug or several lugs distributed over the circumference at one part (spring plate or piston rod head) is in engagement with an annular groove at the respective other part so as to provide temporary shackling of the piston subassembly relative to the cylinder housing. On the other hand, however, the afore-described bead-like or crowned form, which is elevated on both sides, of the fixing section at the spring plate and the mating section of the piston rod is preferred. The preferred configuration makes possible problem-free over-riding in two opposite directions (releasing or shackling) and thus being of advantage particularly with respect to reinstating the temporary fixing of the piston subassembly with respect to the cylinder housing.

In order to ensure a defined angular movability of the piston rod relative to the cylinder housing in simple manner the inner annular section can in addition be provided with cut-outs at sides which are diametrically opposite with respect to a center axis of the cylinder housing, the cut-outs allowing a defined deflection of the piston rod relative to the center axis of the cylinder housing in the released state of the piston subassembly. Depending on the effective diameter of the hydraulic cylinder, the cut-outs at the inner annular section can in that case interrupt the annular shape thereof as seen in circumferential direction (in the case of smaller effective diameters) or, however, form only radial depressions at the inner annular section (in the case of larger effective diameters).

In a particularly simple design of the afore-described spring plate readily able to be produced by, in particular, injection-molding from plastic material the outer annular section thereof can in addition be provided, starting from the free end thereof, with a plurality of axial slots which are distributed over the circumference and extend in the direction of the base section and which divide the outer annular section into segments serving to fix the spring plate to the cylinder housing. Preferably, at least one of the segments forms a spring arm provided at the free end thereof radially outwardly with a lug-like protrusion in engagement with a radial groove formed at the inner circumference of the cylinder housing, so as to secure the spring plate to the cylinder housing in axial direction in the manner of a snap connection. Axial securing of the spring plate to the cylinder housing through a material bond or friction couple by a weld or adhesive connection would in fact also be conceivable as would axial securing mechanically positively in a different manner with the assistance of a separate securing element such as, for example, a wire yoke or a crossbar; however, on the other hand the afore-described snap connection is simpler in terms of assembly. In addition, at least one of the other segments can have at the free end thereof a radially outwardly and axially protruding part-cylindrical end section in engagement with a complementary recess at the inner circumference of the cylinder housing so as to secure the spring plate against rotation in the cylinder housing. It is thus possible to ensure, for example, in a simple manner which is clear and unambiguous for the mounting of the spring plate at the cylinder housing a defined rotational angle orientation of the spring plate with respect to the cylinder housing so as to, for example, align the afore-described deflection region for the piston rod in terms of angle about the center axis of the cylinder housing.

Moreover, it is preferred if the base section of the spring plate has on the side thereof opposite from the annular recess a circularly annular planar end surface by which the spring plate is supported in axial direction of the cylinder housing at an associated annular shoulder formed at the inner circumference of the cylinder housing. This relieves the afore-described snap connection between the spring plate and cylinder housing of spring forces of the spring element, which instead are supported in clear functional association by way of a complete or closed annular surface of the annular shoulder at the cylinder housing.

In further pursuit of the concept according to the invention the spring plate can additionally have an annular centering projection on the side of the base section opposite from the annular recess so as to advantageously integrate further functions into the spring plate. The centering projection, thus, preferably has a conically chamfered outer circumferential surface which in a given case still centering the spring plate with respect to the cylinder axis opposes a mating surface of complementary form at the inner circumference of the cylinder housing. Whereas the conically chamfered outer circumferential surface of the centering projection facilitates, in particular, automated attachment of the spring plate to the cylinder housing, the mating surface of complementary shape at the inner circumference of the cylinder housing advantageously also serves as an entry chamfer for a sealing element at the piston when the piston subassembly is joined to the cylinder housing. In addition, the centering projection of the spring plate can have a conically chamfered inner circumferential surface with which a mating surface of complementary form at the outer circumference of the piston can be brought into contact when the piston subassembly is released, so as to substantially align the piston rod and rigidly connected piston with the center axis of the cylinder housing. This construction on the one hand expedites, at the time of first assembly of the piston subassembly, attachment of the spring plate to the cylinder housing, in which case the spring element preassembled at the piston subassembly stresses the spring plate relative to the piston and in that case as a consequence of the contact of the conically chamfered inner circumferential surface of the centering projection with the mating surface of complementary shape at the outer circumference of the piston sets or holds the spring plate perpendicularly with respect to the piston rod. On the other hand, in the assembled state of the hydraulic cylinder it is thus possible to stress the piston by the spring element against the spring plate fastened to the cylinder housing so as to set or hold the piston rod straight with respect to the cylinder housing by virtue of the contact of the conically chamfered mating surface at the outer circumference of the piston with the inner circumferential surface of complementary shape of the centering projection of the spring plate, which, for example, expedites mounting thereof in the event of exchange of the hydraulic cylinder.

In an equally particularly assembly-friendly construction, the spring element can in addition engage by the piston-distant end thereof at the piston rod head by way of a slotted retaining ring snap-fitted on an associated support surface at the piston rod head and have at the end a radially outwardly protruding annular collar, wherein the piston-distant end of the spring element bears against the side of the collar facing the piston, while the annular collar is axially supported at the side thereof opposite from the piston on an annular shoulder formed at the piston rod head. Such a slotted and thus radially expandable retaining ring can, at the time of preassembly of the spring element with the piston subassembly, be attached to the support surface at the piston rod head without problems as follows. Firstly, the spring element, which is placed on the piston rod, is compressed against the spring plate supported at the piston. Then, the retaining ring can be clipped on to the piston rod, transversely i.e., laterally to the piston rod. Finally, the retaining ring clipped onto the piston rod is axially pushed over the afore-described annular collar, which is substantially crowned as seen in cross-section, of the piston rod head.

In principle, a construction of the piston subassembly is foreseen in which the piston rod is pivotably coupled with the piston. On the other hand, however, it is preferred if the piston is rigidly connected with the piston rod, the piston having an outer contour permitting tilting of the piston subassembly in the cylinder housing. In this embodiment it is advantageous that the cost connected with a pivot connection between piston and piston rod is eliminated. In addition, a piston with a tiltable, i.e., pivotable outer contour, for example, a spherical contour, is less susceptible to dirt than a cylindrical piston which forms, with a cylinder wall of the cylinder housing, a narrow annular gap in which contaminants can deposit. In that case, for preference the piston is injection-molded from plastic material onto the piston rod, which may be metallic, or optionally also injection-molded integrally with the piston rod from plastic material, both of which are beneficial for expeditious and economic production.

Moreover, the embodiment can be such that the piston has an extension which is at the pressure chamber side and on which a sealing element is retained and centered by a retaining ring. The sealing element has an encircling sealing lip slidably and sealably bearing against a sliding surface at the inner circumference of the cylinder housing, wherein the retaining ring is provided on the side thereof opposite from the sealing element with a stiffened prolongation adapted with respect to the length and/or diameter thereof to come into contact with the sliding surface of the cylinder housing when tilting of the piston subassembly in the cylinder housing takes place by a predetermined tilt angle of the piston subassembly relative to the center axis of the cylinder housing, so as to support the piston subassembly at the cylinder housing. Thus, in expeditious fashion, leakage of the hydraulic cylinder due to excessive deformation of the sealing element, for example at the time of demounting the hydraulic cylinder in a workshop is prevented, which leakage could otherwise lead to the hydraulic cylinder being incorrectly regarded as defective and as a consequence subject to time-consuming and expensive replacement.

In principle, the retaining ring can in that case be mounted on the extension of the piston by a weld or adhesive connection. On the other hand, however, with respect to expeditious and economic mounting it is preferred if the retaining ring is secured to the extension of the piston by a snap connection, which can, in particular, be formed particularly easy in plastic material. Ultimately, other mechanically positive connections, optionally in combination with a frictional couple, such as a screw connection, are also conceivable for attaching the retaining ring to the piston extension.

BRIEF DESCRIPTION OF THE DRAWINGS

The invention is explained in more detail in the following by way of a preferred embodiment with reference to the accompanying, partly schematic drawings, in which for simplification of the illustration elastomeric parts are shown in undeformed state and in which.

DETAILED DESCRIPTION OF THE EMBODIMENT

Figure 1:
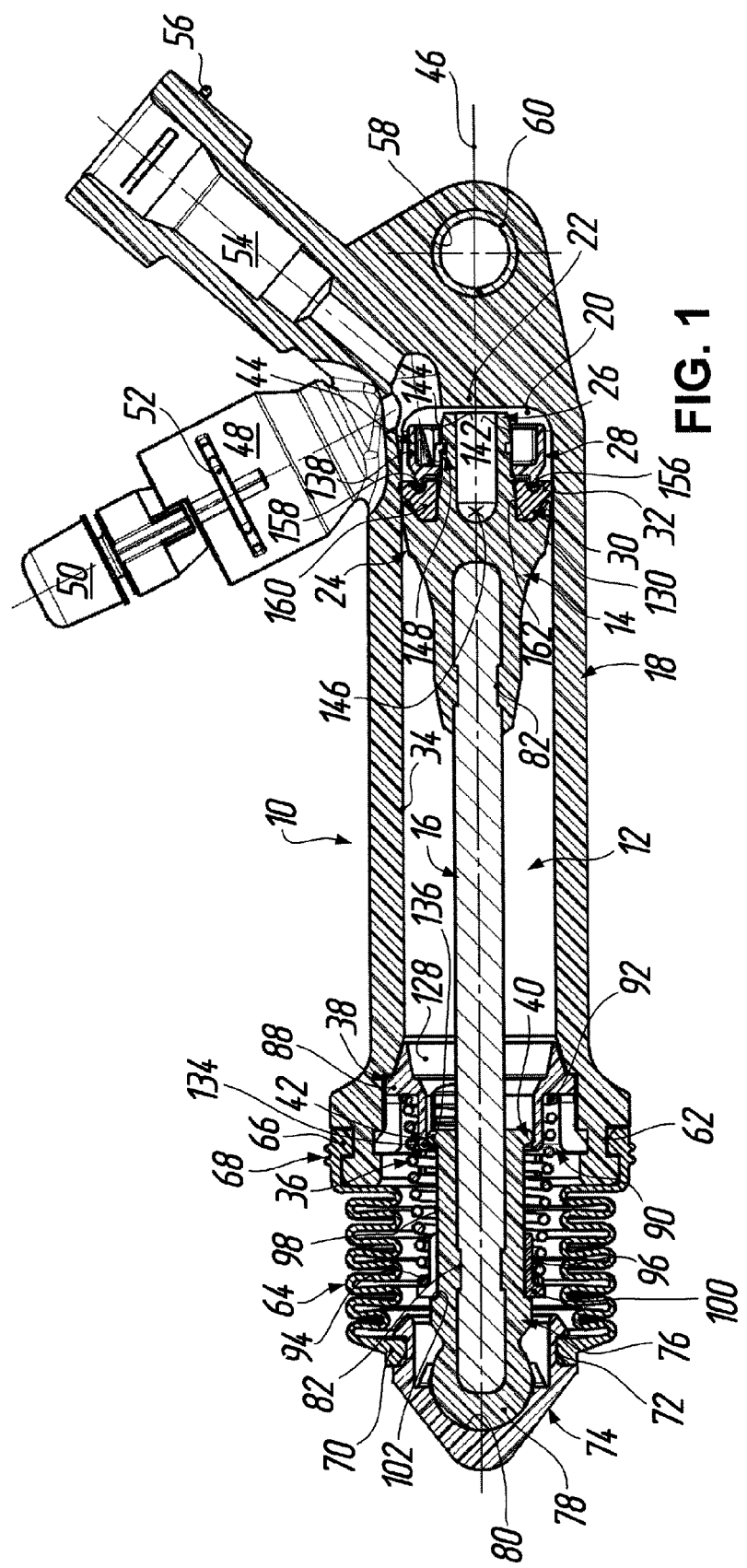
FIG. 1 shows a side view, which is broken away along a center axis up to a bleed connection, of a slave cylinder constructed in accordance with one embodiment of the invention for a hydraulic clutch actuating system for motor vehicles in the uninstalled state, illustrating a piston subassembly which is longitudinally displaceably received in a cylinder housing in a predetermined stroke setting with respect to the cylinder housing in which the piston subassembly is releasably held against the force of a spring element supported by way of a spring plate on the cylinder housing, by a fixing section provided at the spring plate and for this purpose co-operates with a mating section at a piston rod of the piston subassembly.

According to FIG. 1, a slave cylinder 10 for a hydraulic clutch actuating system for motor vehicles has a piston subassembly 12, with a piston 14 and piston rod 16 rigidly connected therewith, as well as a cylinder housing 18 in which is formed a pressure chamber 20 variably bounded on one side (at the left in FIG. 1) by the piston 14 received in the cylinder housing 18 to be longitudinally displaceable and fixedly bounded on the other side (at the right in FIG. 1) by a base 22 of the cylinder housing 18. The piston 14 is injection-molded from plastic material on the piston rod 16 and has an outer contour 24 which allows tilting of the piston subassembly 12 in the cylinder housing 18. In addition, the piston 14 has on the pressure chamber side an extension 26 on which a sealing element 30 is held and centered by a retaining ring 28. The sealing element 30 has an encircling sealing lip 32 slidably and sealably bearing against a sliding surface 34 of the cylinder housing 18 at the inner circumference.

Figure 2:
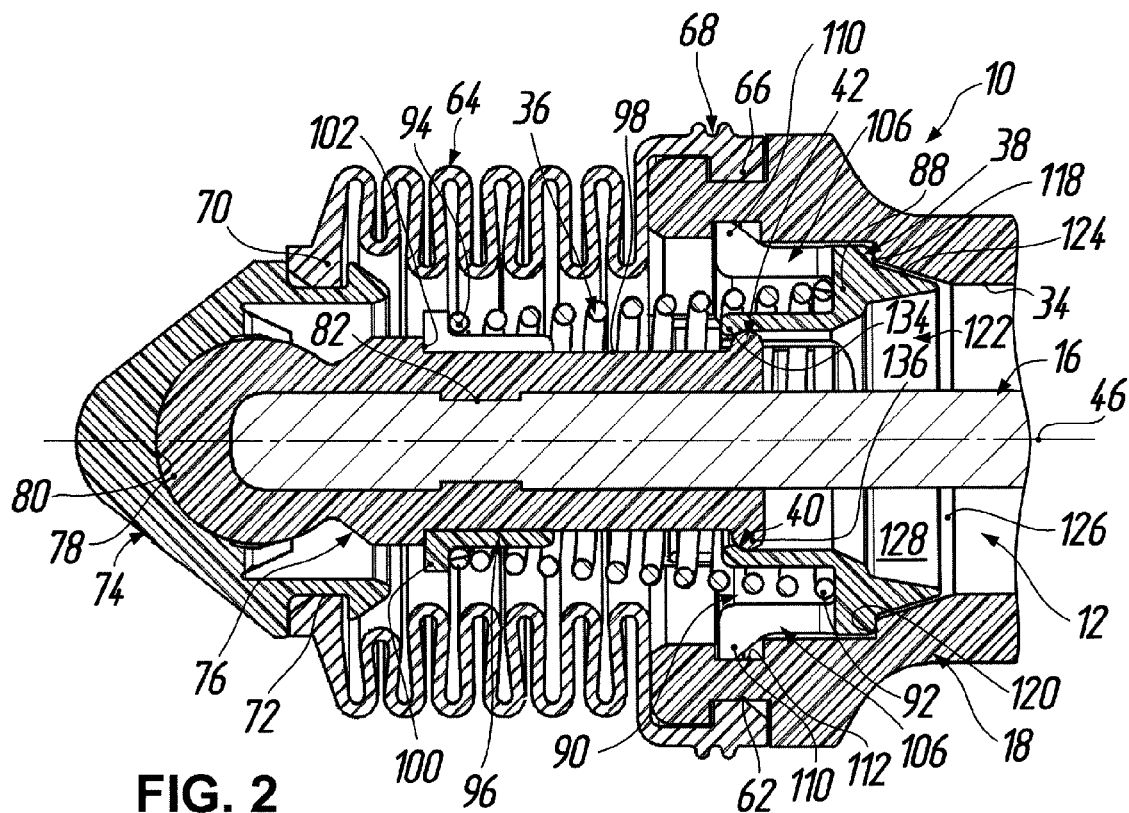
FIG. 2 shows an illustration, which is enlarged in scale by comparison with FIG. 1 and which is broken away to the right, but otherwise corresponds with FIG. 1, of the end of the slave cylinder according to FIG. 1 at the left in FIG. 1, for depiction of further details with respect to the measures for temporary shackling of the piston subassembly relative to the cylinder housing.

A spring element 36 is arranged at the side of the piston 14 opposite from the pressure chamber 20. The spring element is supported at one end on a spring plate 38 on the side of the housing and is operatively connected at the other end with the piston rod 16 so as to bias the piston subassembly 12 in a direction away from the base 22 of the cylinder housing 18. The spring plate 38 is a separate part from the cylinder housing 18. In addition, a fixing section 40 is provided, which fixes the piston subassembly 12 in a predetermined stroke setting with respect to the cylinder housing 18 before first actuation of the slave cylinder 10, as shown in FIGS. 1 and 2, and which is constructed to release the piston subassembly 12 relative to the cylinder housing 18 when first actuation of the slave cylinder 10 takes place, so that the piston rod 16 of the slave cylinder 10 can be temporarily shackled with respect to the cylinder housing 18 of the slave cylinder 10 for avoidance of overfilling of the hydraulic clutch actuating system, for transport of the slave cylinder 10 and for simplification of mounting of the unit in the motor vehicle.

As will be described in more detail in the following with reference to, in particular, FIGS. 2, 4 to 7 and 10, the fixing section 40 is formed at the spring plate 38 and co-operates with a mating section 42 at the piston rod 16 for releasable fixing of the piston subassembly 12 with respect to the cylinder housing 18.

In addition, as will similarly be explained in more detail in the following on the basis of, in particular, FIGS. 11 to 15, the retaining ring 28 is provided with a stiffened prolongation 44 on the side thereof opposite from the sealing element 30. The stiffened prolongation 44 is adapted with respect to the length and/or diameter thereof to come into contact with the sliding surface 34 of the cylinder housing 18 when tilting of the piston subassembly 12 in the cylinder housing takes place so as to support the piston subassembly 12 at the cylinder housing 18 when a predetermined tilt angle of the piston subassembly 12 relative to the center axis 46 of the cylinder housing 18, for example, 5° is reached, so that leakages between the sealing lip 32 of the sealing element 30 and the sliding surface 34 in the cylinder housing 18 are reliably avoided.

According to FIG. 1, the cylinder housing 18 of the slave cylinder 10 is injection-molded from plastic material and is provided in the region of the base 22 with two integrally formed connections which open into the pressure chamber 20 at the end thereof on the right in FIG. 1. These connections are on the one hand a bleed connection 48 in which a bleeder 50 known per se is sealably received and secured by a securing element 52 and on the other hand a pressure connection 54 into which a pressure line (not shown) is insertable by a plug member to be hydraulically sealed and is fixable by a further securing element 56, so as to hydraulically connect the slave cylinder 10 with a clutch master cylinder (not illustrated) in a manner known per se. In order to secure the slave cylinder 10 to, for example, a transmission wall (not shown) the cylinder 18 additionally has near the base 22 a fastening bore 58 which is lined or reinforced by a slotted steel bush 60 through which in the mounted state of the slave cylinder 10, for example, a screw (not illustrated) extends as a fastening measure.

The open end of the cylinder housing 18 on the left in FIG. 1 is provided at the outer circumference with a radial groove 62 in which an elastomeric bellows 64 is located by an annular collar 66 at the inner circumference to protectively surround the spring element 36. Fastening measures (not shown) radially retain the annular collar 66 at 68 (engagement point for the fastening measures) in this position. The bellows 64 is provided at the end thereof opposite from the cylinder housing 18 and at the inner circumference with a further annular collar 70 which is located in a radial groove 72 formed in a protective dust cap 74. The protective dust cap 74, by way of which the piston rod 16 in the mounted state of the slave cylinder 10 in the motor vehicle engages a clutch lever (not shown) to be effective in terms of actuation, is articulated to the piston rod 16 in a manner known per se to be pivotable relative to the piston rod 16. More specifically, the piston rod 16 has a piston rod head 76 with a ball end 78 which mechanically positively engages in an inner ball guide section 80 of the protective dust cap 74.

In the illustrated embodiment the piston rod head 76, like the piston 14, is also injection-molded from plastic material on the metallic piston rod 16. Profilings which here are in the form of grooves 82 into which the plastic material can penetrate and which are formed at the ends of the rod-shaped piston rod 16 in that case ensure tension-resistant and compression-resistant fixing of the piston rod head 76 or the piston 14 to the piston rod 16.

The cylinder housing 18 has its inner circumference multiply stepped at the open end thereof in front of the sliding surface 34 to have a diameter decreasing towards the sliding surface 34 and chamfered so as to receive the spring plate 38. These steps and chamfers at the inner circumference of the cylinder housing 18 co-operate with complementary geometries at the spring plate 38 as will be described in more detail in the following.

Further details of the spring plate 38, which is formed by an annular member separate from the cylinder housing 18, can be inferred from, in particular, FIGS. 4 to 7 and 10. According to those, the spring plate 38 has, in general, an inner annular section 84 through which the piston rod 16 extends (see FIGS. 1 and 2), an outer annular section 86 by way of which the spring plate 38 is secured, in a manner still to be described, to the cylinder housing 18, and a base section 88 connecting the inner annular section 84 and the outer annular section 86. In that case, the aforesaid sections 84, 86 and 88 of the spring plate 38 bound an annular recess 90 which, as FIGS. 1 and 2 show serves for reception of a larger diameter end 92, which is near the piston, of the spring element 36. As illustrated, the spring element is constructed as a substantially conically formed helical compression spring.

Accordingly, the spring element 36 is supported by its piston-adjacent end 92 which is on the right in FIGS. 1 and 2, on the base section 88 of the spring plate 38. The smaller diameter end 94 of the spring element 36 which is on the left in FIGS. 1 and 2 and distant from the piston, engages the piston rod head 76 by way of a slotted counter retaining ring 96. The retaining ring 96 is snap-fitted on an associated support surface 98 at the piston rod head 76 and has at the end a radially outwardly protruding annular collar 100 that bears against the piston-distant end 94 of the spring element 36. The annular collar 100 is axially supported on its side opposite from the piston 14 on an annular shoulder 102 formed on the piston rod head 76. The spring element 36 is supported by way of the spring plate 38 on the cylinder housing 18 to exert on the piston subassembly 12 via the piston rod head 76 a force which acts towards the left in FIGS. 1 and 2 and endeavors to urge the protective dust cap 74 to the left and by way of the piston rod 16 to draw the piston 14 away from the base 22 of the cylinder housing 18.

Figure 4:
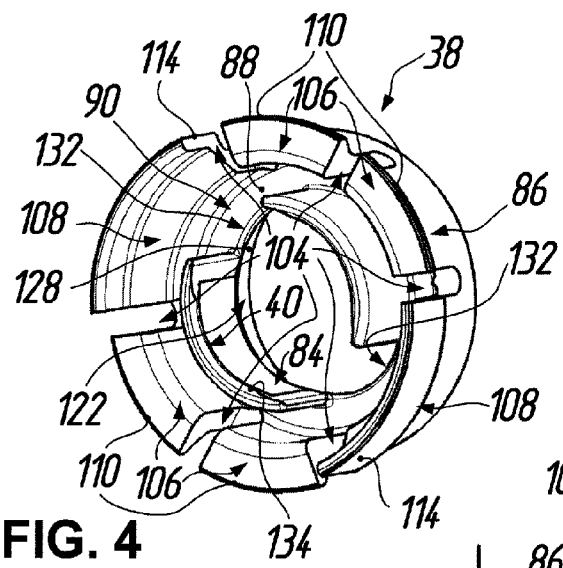
FIG. 4 shows a perspective illustration, which is enlarged in scale by comparison with FIG. 1, of the spring plate, which is separated from the cylinder housing, of the slave cylinder according to FIG. 1 obliquely from the front.
Figure 5:
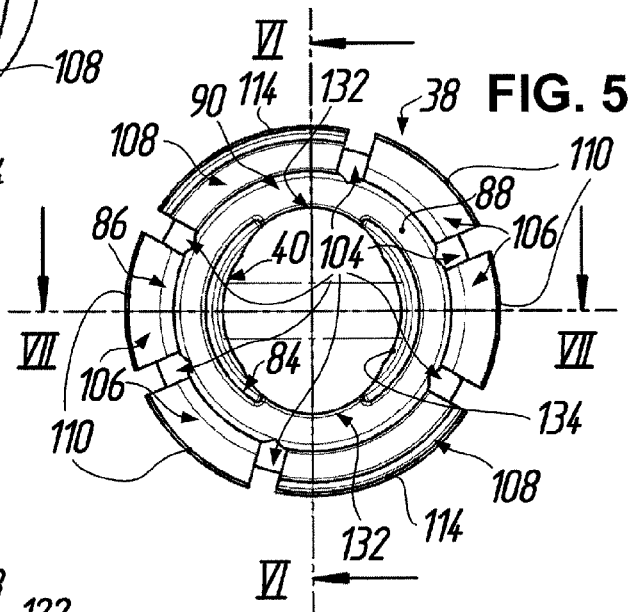
FIG. 5 shows a front view of the spring plate according to FIG. 4 in the scale of FIG. 4.

According to, in particular, FIGS. 4 and 5 the outer annular section 86 of the spring plate 38 is provided, starting from its free end, with a plurality of axial slots 104 distributed over the circumference and extending in the direction of the base section 88. The slots 104 divide the outer annular section 86 into different segments 106, 108 serving to fix the spring plate 38 to the cylinder housing 18. In that case, the segments 106 in the illustrated embodiment form four spring arms which according to, in particular, FIG. 7 are provided at each of the free ends thereof and radially outwardly with a respective lug-like protrusion 110 in engagement with a radial groove 112, which is formed at the inner circumference of the cylinder housing 18, so as to secure the spring plate 38 in axial direction to the cylinder housing 18 in the manner of a snap connection. In addition, the two other diametrically opposite segments 108 of the outer annular section 86 of the spring plate 38 in the illustrated embodiment have, according to, in particular, FIGS. 4, 6, 7 and 10, at each of the free ends thereof a respective radially outwardly and axially protruding part-cylindrical end section 114 which mechanically positively engages with a respective complementary recess 116 at the inner circumference of the cylinder housing 18 (see, in particular, FIGS. 8 and 10) so as to secure the spring plate 38 against rotation in the cylinder housing 18.

Figure 3:
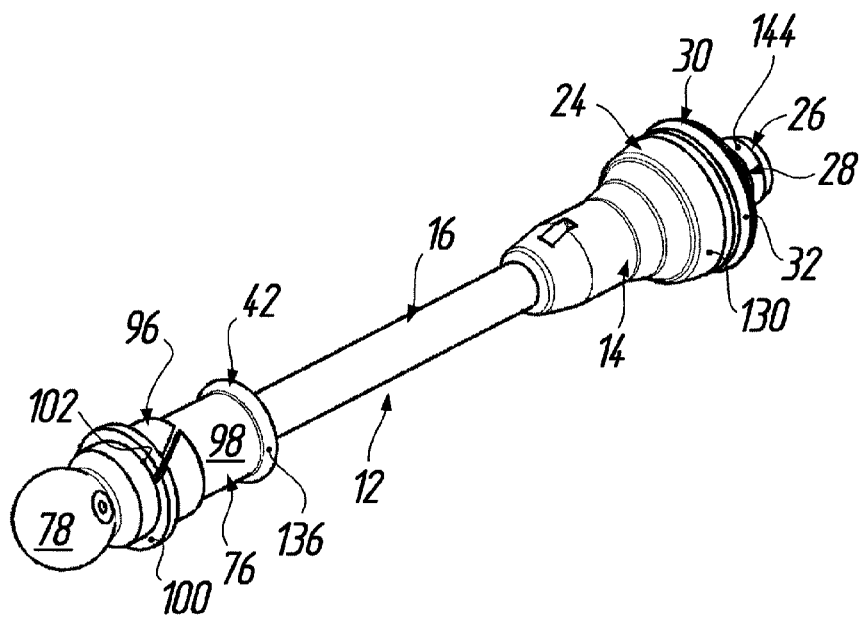
FIG. 3 shows a perspective illustration of the piston subassembly, which is separated from the cylinder housing, of the slave cylinder according to FIG. 1 with a slotted retaining ring, which is mounted on the piston rod head, for the spring element.
Figure 6:
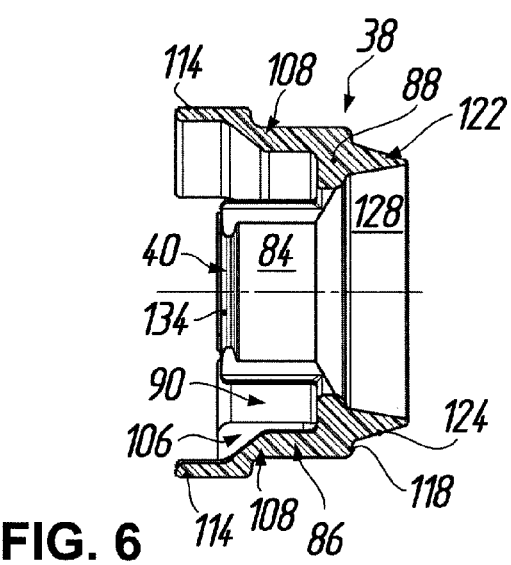
FIG. 6 shows a longitudinal sectional view of the spring plate according to FIG. 4 in correspondence with the section line VI-VI in FIG. 5.
Figure 7:
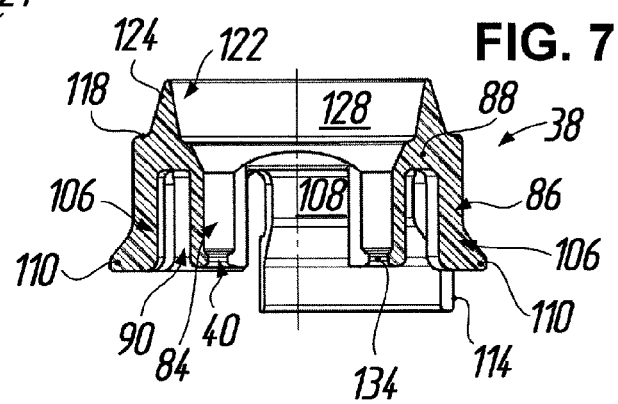
FIG. 7 shows a longitudinal sectional view of the spring plate according to FIG. 4 in correspondence with the section line VII-VII in FIG. 5.
Figure 8:
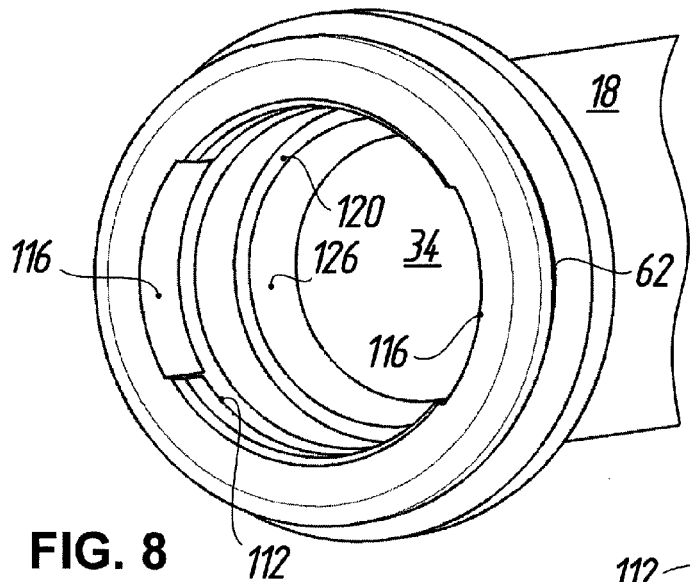
FIG. 8 shows a perspective illustration, which is broken away to the right, of an open end of the cylinder housing of the slave cylinder according to FIG. 1 obliquely from the front and in the scale of FIG. 4, without the spring plate mounted on the cylinder housing.
Figure 9:
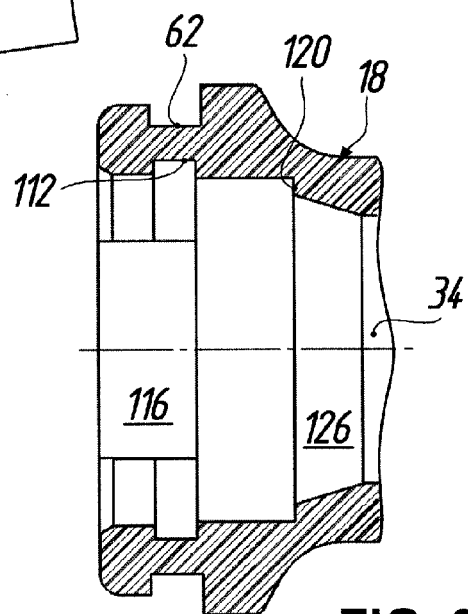
FIG. 9 shows a longitudinal sectional view, which is broken away to the right, of the cylinder housing of FIG. 8 in the region of the open end, without the plate spring mounted on the cylinder housing.

As can be further inferred from, in particular, FIGS. 2, 6 and 7 the base section 88 of the spring plate 38 has at its side opposite from the annular recess 90 a circularly annular planar end surface 118 by which the spring plate 38 is supported in axial direction of the cylinder housing 18 on an associated annular shoulder 120 formed at the inner circumference of the cylinder housing 18. An annular centering projection 122 is formed, as again can be best seen in FIGS. 2, 6 and 7, radially within the circularly annular end surface 118 on the spring plate 38 at the side of the base section opposite from the annular recess 90. The centering projection 122 has a conically chamfered outer circumferential surface 124 which, according to FIG. 2, opposes a mating surface 126 of complementary shape at the inner circumference of the cylinder housing 18. In addition, the centering projection 122 has a conically chamfered inner circumferential surface 128 against which a mating surface 130 of complementary shape at the outer circumference of the piston 14 (see FIGS. 1 and 3) can be brought into contact, when the piston subassembly 12 is released from the fixing section 40, so as to substantially align the piston rod 16 with the center axis 46 of the cylinder housing 18.

Figure 10:
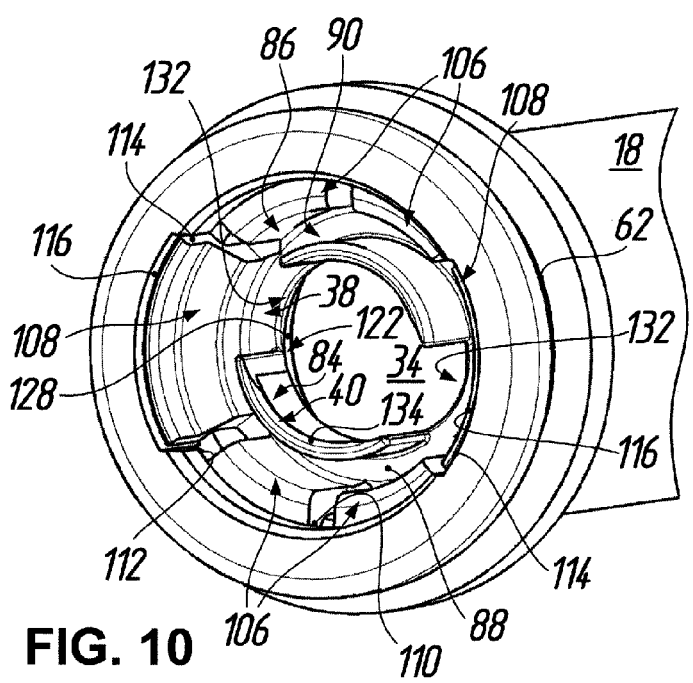
FIG. 10 shows a perspective illustration, which is broken away to the right and corresponds in viewing angle and scale with FIG. 8, of the open end of the cylinder housing of the slave cylinder according to FIG. 1, with the spring plate according to FIG. 4 mounted on the cylinder housing.

As, in particular, FIGS. 4, 5 and 10 in addition show the inner annular section 84 of the spring plate 38 is provided with a total of two cut-outs 132 on sides which are diametrically opposite with respect to the center axis 46 of the cylinder housing 18, the cut-outs interrupting the inner annular section 84 in the illustrated embodiment and extending in axial direction up to the base section 88 of the spring plate 38. The cut-outs 132 allow a defined deflection of the piston rod 16 relative to the center axis 46 of the cylinder housing 18 in the state of release of the piston subassembly 12 from the fixing section 40, specifically when the piston rod 16 is pivoted from a substantially central position with respect to the cylinder housing 18 in the direction of a cut-out 132. The inner annular section 84 of the spring plate 38 otherwise limits, depending on the stroke setting of the piston 14 in the cylinder housing 18, the deflection of the piston rod 16, in which case, however, the retaining ring 28 at the piston 14 ensures that a predetermined tilt angle of the piston subassembly 12 relative to the center axis 46 of the cylinder housing 18 is never exceeded, as already explained further above.

Finally, the inner annular section 84 of the spring plate 38 has at the free end thereof at the inner circumference an annular bead 134 which forms the fixing section 40 of the spring plate 38 and can spring back slightly in radial direction and which in the embodiment illustrated here is interrupted by the cut-outs 132. In addition, the piston rod head 76 is provided at the end thereof facing the piston 14 at the outer circumference with an annular collar 136 which forms the afore-mentioned mating section 42 at the piston rod 16 and is substantially crowned as seen in cross-section (cf. FIG. 2) and which in the fixed state of the spring-biased piston subassembly 12 is axially supported on the annular bead 134 of the spring plate 38 so as to temporarily shackle the piston subassembly 12 in the cylinder housing 18 in the setting shown in FIGS. 1 and 2.

Figure 11:
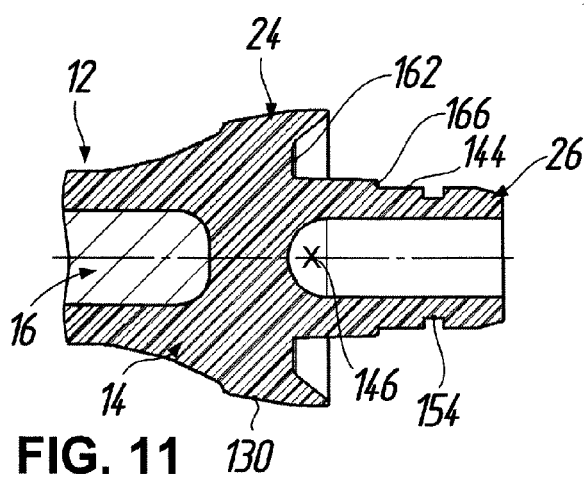
FIG. 11 shows a longitudinal sectional view, which is broken away to the left, of a piston, which is mounted on the piston rod, of the piston subassembly of the slave cylinder according to FIG. 1 in the scale of FIG. 2, without sealing element and retaining ring therefor.
Figure 12:
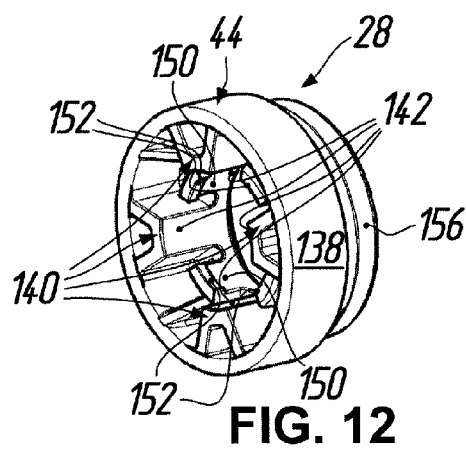
FIG. 12 shows a perspective illustration, which is enlarged in scale by comparison with FIG. 1, of the retaining ring, which is separated from the piston of the slave cylinder according to FIG. 1, for the sealing element obliquely from the front.
Figure 13:
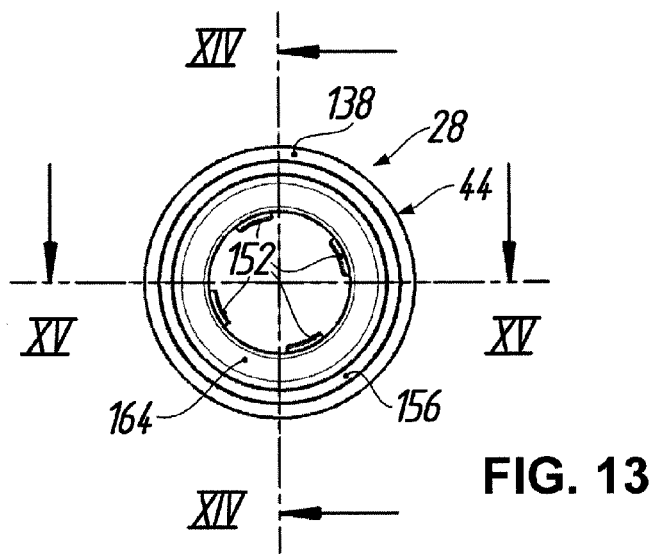
FIG. 13 shows a rear view of the retaining ring according to FIG. 12 in the scale of FIG. 12.
Figure 14:
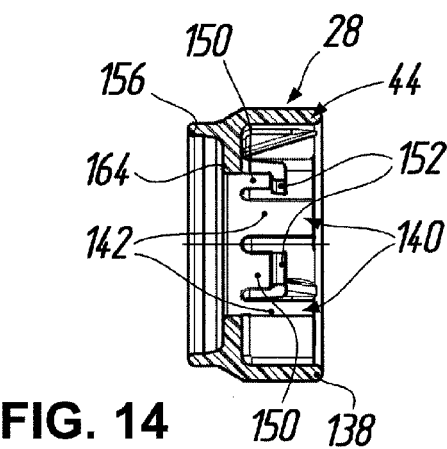
FIG. 14 shows a longitudinal sectional view of the retaining ring according to FIG. 12 in correspondence with the section line XIV-XIV in FIG. 13.
Figure 15:
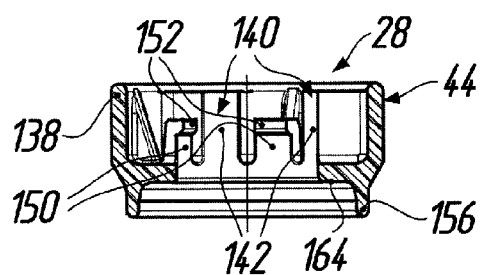
FIG. 15 shows a longitudinal sectional view of the retaining ring according to FIG. 12 in correspondence with the section line XV-XV in FIG. 13.

Further details with respect to the retaining ring 28 and attachment thereof to the extension 26 of the piston 14 are illustrated in FIGS. 11 to 15. According to FIGS. 12, 14 and 15 the prolongation 44 of the retaining ring 28 has a substantially hollow-cylindrical outer section 138 which is supported in radial direction on the extension 26 of the piston 14 by way of a plurality in the illustrated embodiment, four stiffening elements 140 uniformly distributed over the inner circumference of the outer section 138. As can be seen in FIG. 12, the stiffening elements 140 extend in axial direction along the outer section 138 and have a construction like a hollow-chambered section member with a substantially trapezium-shaped cross-section. In the mounted state of the retaining ring 28 (see FIG. 1) the stiffening elements 140 each bear by the radially inner narrow side 142 thereof against the extension 26 of the piston 14, more precisely the outer circumferential surface 144 thereof.

For example, in the course of demounting the slave cylinder 10 from its installation location a greater degree of deflection of the piston rod 16, and thus, of the entire piston subassembly 12 relative to the center axis 46 of the cylinder housing 18 can take place. The piston 14 may then tilt, i.e., pivot about a virtual fulcrum 146 approximately at the axial location of the sealing element 30. The piston 14 is, however, supported on the sliding surface 34 of the cylinder housing 18 by way of the outer circumferential surface 144 of its extension 26, the corresponding narrow side or sides 142 of the stiffening element or elements 140 of the retaining ring 28 and the outer section 138 thereof, specifically the radially outer end of the outer section 138 opposite from the piston 14. In particular, support takes place at an axial spacing from the virtual fulcrum 146 of the piston 14 and thus with a specific lever arm. As a result, deformation of the sealing lip 32, which is pressed against the sliding surface 34 of the cylinder housing 18, of the sealing element 30 is reliably prevented from being excessive, and thus, leakage of hydraulic fluid from the pressure chamber 20 is also prevented.

As can also be inferred from FIG. 1, the retaining ring 28 is secured to the extension 26 of the piston 14 by a snap connection 148. For that purpose, the retaining ring 28 according to FIGS. 12 to 15 has a plurality in the illustrated embodiment, for example, a total of four of spring arms 150 which extend in axial direction and which are provided at each of the free ends thereof and radially inwardly with a respective lug-like projection 152 in engagement with a radial groove 154 as illustrated in FIG. 11 formed at the outer circumference, i.e., outer circumferential surface 144 of the extension 26. As can be best seen in FIG. 12, the spring arms 150 of the retaining ring 28 as seen in circumferential direction are respectively arranged between adjacent stiffening elements 140 of the retaining ring 28 so that the stiffening elements 140 and the spring arms 150 of the retaining ring 28 are disposed approximately at the same axial location of the piston subassembly 12.

The retaining ring 28 is additionally provided at the side thereof facing the piston 14 with an annular pressing projection 156 which engages in an annular axial groove 158 of the sealing element 30. The axial groove 158 separates, on the side of the sealing element 30 opposite from the piston 14, the sealing lip 32 from an annular fastening section 160 of the sealing element 30. The fastening section 160 is seated on the extension 26 of the piston 14 in an annular axial groove 162 of the piston 14 open towards the pressure chamber 20.

Finally, the retaining ring 28 additionally has at the side thereof facing the piston 14 and radially within the pressing projection 156 a circularly annular planar end surface 164 by way of which the retaining ring 28 can be supported in an axial direction of the piston 14 on an associated annular shoulder 166, which according to FIG. 11 is formed at the outer circumference of the extension 26 of the piston 14 so that a mounting abutment is present which reliably prevents damage of the sealing element 30 and/or of the spring arms 150 with lug-like projections 152 of the retaining ring 28 at the time of assembly of these components which may be automated.

A hydraulic cylinder, particularly a slave cylinder for a hydraulic clutch actuating system for motor vehicles, has a piston subassembly with a piston and piston rod, a cylinder housing in which is provided a pressure chamber variably bounded at one side by the piston and fixedly bounded at the other side by a base of the cylinder housing. A spring element is arranged at the side of the piston opposite from the pressure chamber. The spring element is supported at one end on a spring plate on the housing side and being operatively connected at the other end with the piston rod so that the piston subassembly is biased in a direction away from the base. A fixing section fixes the piston subassembly in a predetermined stroke setting with respect to the cylinder housing prior to first actuation of the hydraulic cylinder and which is constructed for the purpose of releasing the piston subassembly relative to the cylinder housing when the first actuation takes place. The fixing section is constructed in very compact and expeditious form at the spring plate and co-operates with a mating section at the piston rod for releasable fixing of the piston subassembly with respect to the cylinder housing.

Variations and modifications are possible without departing from the scope and spirit of the present invention as defined by the appended claims.

I claim:

1. A hydraulic cylinder for a hydraulic actuating system for motor vehicles, comprising
    a piston subassembly with a piston and a piston rod,
    a cylinder housing with a pressure chamber variably bounded at one side by the piston and fixedly bounded at the other side by a base of the cylinder housing,
    a spring element arranged at the side of the piston opposite from the pressure chamber and supported at one end on a spring plate on the housing side which is fixed with respect to the cylinder housing and operatively connected at the other end with the piston rod so as to bias the piston subassembly in a direction away from the base of the cylinder housing, and
    a fixing section fixing the piston subassembly in a predetermined stroke setting with respect to the cylinder housing prior to first actuation of the hydraulic cylinder and constructed to release the piston subassembly relative to the cylinder housing when first actuation of the hydraulic cylinder takes place,
    characterized in that the fixing section is part of the spring plate and co-operates with a mating section at the piston rod for releasable fixing of the piston subassembly with respect to the cylinder housing and the fixing section cooperates with the mating section at the piston rod axially between the one end and the other end of the spring element within the axial confines of the spring element.

2. A hydraulic cylinder according to claim 1, characterized in that the spring plate is formed by an annular member with an inner annular section through which the piston rod extends, an outer annular section by way of which the spring plate is secured to the cylinder housing, a base section connecting the inner annular section and the outer annular section, and an annular recess bounded between the inner, outer and base sections for receiving a piston-adjacent end of the spring element.

3. A hydraulic cylinder according to claim 2, characterized in that the inner annular section has an annular bead at a free end thereof at the inner circumference said annular bead forming the fixing section of a spring plate and being capable of radial spring-back, whereas the piston rod has a piston rod head provided at the outer circumference with a substantially crowned annular collar which forms the mating section at the piston rod and which in the fixed state of the piston subassembly is axially supported on the annular bead.

4. A hydraulic cylinder according to claim 3, characterized in that the inner annular section is provided with cut-outs at sides which are diametrically opposite with respect to a center axis of the cylinder housing, the cut-outs permitting a defined deflection of the piston rod relative to the center axis of the cylinder housing in the released state of the piston subassembly.

5. A hydraulic cylinder according to claim 3, characterized in that the spring element engages by a piston-distant end thereof at the piston rod head by way of a slotted retaining ring which is snap-fitted on an associated support surface at the piston rod head and which has at an end a radially outwardly protruding annular collar, against the side of which facing the piston the piston-distant end of the spring element bears, the annular collar being axially supported at a side thereof opposite from the piston on an annular shoulder formed on the piston rod head.

6. A hydraulic cylinder according to claim 2, characterized in that the inner annular section is provided with cut-outs at sides which are diametrically opposite with respect to a center axis of the cylinder housing, the cut-outs permitting a defined deflection of the piston rod relative to the center axis of the cylinder housing in the released state of the piston subassembly.

7. A hydraulic cylinder according to claim 2, characterized in that the outer annular section starting from a free end thereof is provided with a plurality of axial slots which are distributed over the circumference and extend in the direction of the base section and which divide the outer annular section into segments serving to fix the spring plate to the cylinder housing.

8. A hydraulic cylinder according to claim 2, characterized in that the base section has on a side thereof opposite from the annular recess a circularly annular planar end surface by which the spring plate is supported in axial direction of the cylinder housing on an associated annular shoulder formed at the inner circumference of the cylinder housing.

9. A hydraulic cylinder according to claim 2, characterized in that the spring plate has an annular centering projection at a side of the base section opposite from the annular recess.

10. A hydraulic cylinder according to claim 9, characterized in that the centering projection has a conically chamfered outer circumferential surface opposing a mating surface of complementary form at the inner circumference of the cylinder housing.

11. A hydraulic cylinder according to claim 9, characterized in that the centering projection has a conically chamfered inner circumferential surface with which a mating surface of complementary form at the outer circumference of the piston can be brought into contact, when the piston subassembly is released, so as to substantially align the piston rod with the center axis of the cylinder housing.

12. A hydraulic cylinder according to claim 1, characterized in that the piston is rigidly connected with the piston rod, wherein the piston has an outer contour permitting tilting of the piston subassembly in the cylinder housing.

13. A hydraulic cylinder according to claim 12, characterized in that the piston has an extension which is at the pressure chamber side and on which a sealing element is retained and centered by a retaining ring, the sealing element has an encircling sealing lip slidably and sealably bearing against a sliding surface at the inner circumference of the cylinder housing, wherein the retaining ring is provided on a side thereof opposite from the sealing element with a stiffened prolongation adapted with respect to a length and/or diameter thereof to come into contact with the sliding surface of the cylinder housing when tilting of the piston subassembly in the cylinder housing takes place by a predetermined tilt angle of the piston subassembly relative to the center axis of the cylinder housing, so as to support the piston subassembly at the cylinder housing.

14. A hydraulic cylinder according to claim 13, characterized in that the retaining ring is secured to the extension of the piston rod by a snap connection.

15. A hydraulic cylinder according to claim 12, characterized in that the piston is injection-molded from plastic material on the piston rod.

16. A hydraulic cylinder for a hydraulic actuating system for motor vehicles, comprising
   a piston subassembly with a piston and a piston rod,
   a cylinder housing with a pressure chamber variably bounded at one side by the piston and fixedly bounded at the other side by a base of the cylinder housing,
   a spring element arranged at the side of the piston opposite from the pressure chamber and supported at one end on a spring plate on the housing side and operatively connected at the other end with the piston rod so as to bias the piston subassembly in a direction away from the base of the cylinder housing, and
   a fixing section fixing the piston subassembly in a predetermined stroke setting with respect to the cylinder housing prior to first actuation of the hydraulic cylinder and constructed to release the piston subassembly relative to the cylinder housing when first actuation of the hydraulic cylinder takes place,
   characterized in that the fixing section is formed at the spring plate and co-operates with a mating section at the piston rod for releasable fixing of the piston subassembly with respect to the cylinder housing;
   the spring plate is formed by an annular member with an inner annular section through which the piston rod extends, an outer annular section by way of which the spring plate is secured to the cylinder housing, a base section connecting the inner annular section and the outer annular section, and an annular recess bounded between the inner, outer and base sections for receiving a piston-adjacent end of the spring element;
   the inner annular section has an annular bead at the free end thereof at the inner circumference, said annular bead forming the fixing section of a spring plate and being capable of radial spring-back, whereas the piston rod has a piston rod head provided at the outer circumference with a substantially crowned annular collar which forms the mating section at the piston rod and which in the fixed state of the piston subassembly is axially supported on the annular bead;
   the inner annular section is provided with cut-outs at sides which are diametrically opposite with respect to a center axis of the cylinder housing, the cut-outs permitting a defined deflection of the piston rod relative to the center axis of the cylinder housing in the released state of the piston subassembly; and
   the outer annular section starting from a free end thereof is provided with a plurality of axial slots which are distributed over the circumference and extend in the direction of the base section and which divide the outer annular section into segments serving to fix the spring plate to the cylinder housing by a snap fit connection.

17. A hydraulic cylinder according to claim 16, characterized in that at least one segment forms a spring arm provided at a free end thereof radially outwardly with a lug-like profusion in engagement with a radial groove, which is formed at the inner circumference of the cylinder housing, to secure the spring plate to the cylinder housing in axial direction in the manner of a snap connection.

18. A hydraulic cylinder according to claim 17, characterized in that at least one other segment has at a free end thereof a radially outwardly and axially protruding part-cylindrical end section in engagement with a complementary cut-out at the inner circumference of the cylinder housing to secure the spring plate against rotation in the cylinder housing.

19. A hydraulic cylinder according to claim 18, characterized in that the base section has on a side thereof opposite from the annular recess a circularly annular planar end surface by which the spring plate is supported in axial direction of the cylinder housing on an associated annular shoulder formed at the inner circumference of the cylinder housing.

20. A hydraulic cylinder according to claim 19, characterized in that the spring plate has an annular centering projection at the side of the base section opposite from the annular recess.

21. A hydraulic cylinder according to claim 20, characterized in that the centering projection has a conically chamfered outer circumferential surface opposing a mating surface of complementary form at the inner circumference of the cylinder housing.

22. A hydraulic cylinder according to claim 21, characterized in that the centering projection has a conically chamfered inner circumferential surface with which a mating surface of complementary form at the outer circumference of the piston can be brought into contact, when the piston subassembly is released, so as to substantially align the piston rod with the center axis of the cylinder housing.

23. A hydraulic cylinder for a hydraulic actuating system for motor vehicles, comprising
   a piston subassembly with a piston and a piston rod,
   a cylinder housing with a pressure chamber variably bounded at one side by the piston and fixedly bounded at the other side by a base of the cylinder housing,
   a spring element arranged at the side of the piston opposite from the pressure chamber and supported at one end on a spring plate on the housing side and operatively connected at the other end with the piston rod so as to bias the piston subassembly in a direction away from the base of the cylinder housing, and
   a fixing section fixing the piston subassembly in a predetermined stroke setting with respect to the cylinder housing prior to first actuation of the hydraulic cylinder and constructed to release the piston subassembly relative to the cylinder housing when first actuation of the hydraulic cylinder takes place,
   characterized in that the fixing section is formed at the spring plate and co-operates with a mating section at the piston rod for releasable fixing of the piston subassembly with respect to the cylinder housing;
   the spring plate is formed by an annular member with an inner annular section through which the piston rod extends, an outer annular section by way of which the spring plate is secured to the cylinder housing, a base section connecting the inner annular section and the outer annular section, and an annular recess bounded between the inner, outer and base sections for receiving a piston-adjacent end of the spring element;
   the inner annular section has an annular bead at the free end thereof, interrupted by circumferential spaced cut outs and is resiliently flexible in a radially outward direction, said inner annular section extending axially outwardly away from said base section and the base of the cylinder housing toward its annular bead, said annular bead forming the fixing section of said spring plate and being capable of radial spring-back, whereas the piston rod has a piston rod head provided at the outer circumference with a substantially crowned annular collar which forms the mating section at the piston rod and which in the fixed state of the piston subassembly is axially supported on the annular bead.

* * * * *

UNITED STATES PATENT AND TRADEMARK OFFICE
CERTIFICATE OF CORRECTION

PATENT NO. : 9,890,803 B2  
APPLICATION NO. : 15/226257  
DATED : February 13, 2018  
INVENTOR(S) : Jürgen Ryba Page 1 of 1

It is certified that error appears in the above-identified patent and that said Letters Patent is hereby corrected as shown below:

In the Claims

Claim 17, Column 15, Line 61 please delete "profusion" and insert --protrusion-- therefor.

Signed and Sealed this  
Second Day of October, 2018

Andrei Iancu  
*Director of the United States Patent and Trademark Office*